United States Patent
Mutschler et al.

(10) Patent No.: US 7,559,276 B2
(45) Date of Patent: Jul. 14, 2009

(54) COMPENSATION OF CYLINDER VIBRATION IN PRINTING MATERIAL PROCESSING MACHINES

(75) Inventors: Peter Mutschler, Gorxheimertal (DE); Matthias Noell, Weiterstadt (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 362 days.

(21) Appl. No.: 11/489,890

(22) Filed: Jul. 20, 2006

(65) Prior Publication Data

US 2006/0254442 A1    Nov. 16, 2006

Related U.S. Application Data

(63) Continuation of application No. 10/417,284, filed on Apr. 16, 2003, now abandoned.

(30) Foreign Application Priority Data

Apr. 17, 2002   (DE) .................. 102 17 707

(51) Int. Cl.
 B41F 5/16  (2006.01)
 B41F 5/18  (2006.01)
 B41F 5/00  (2006.01)
 B41F 7/00  (2006.01)
 B41F 13/00 (2006.01)
 B41F 5/04  (2006.01)
 B41F 13/02 (2006.01)

(52) U.S. Cl. .................. 101/181; 101/183; 101/212; 101/216; 101/219

(58) Field of Classification Search .......... 101/181, 101/183, 212, 216, 219, 484, 492; 702/195, 702/56; 73/587, 593, 646, 659

See application file for complete search history.

(56) References Cited

U.S. PATENT DOCUMENTS

| | | | |
|---|---|---|---|
| 3,731,526 A | 5/1973 | Games | 73/660 |
| 4,047,002 A * | 9/1977 | Sloane et al. | 708/400 |
| 4,395,904 A | 8/1983 | Ivanov et al. | 73/118.1 |
| 4,566,118 A | 1/1986 | Chaplin et al. | 381/71.9 |
| 4,724,763 A | 2/1988 | Bolza-Schunemann et al. | 101/492 |
| 4,876,679 A | 10/1989 | Mukai | 369/44.29 |
| 4,980,623 A | 12/1990 | Anton | 318/432 |
| 5,359,269 A | 10/1994 | Wedeen et al. | 318/432 |

(Continued)

FOREIGN PATENT DOCUMENTS

DE   691 16 461 T2   2/1992

(Continued)

*Primary Examiner*—Ren Yan
*Assistant Examiner*—Leo T Hinze
(74) *Attorney, Agent, or Firm*—Davidson, Davidson & Kappel, LLC

(57) ABSTRACT

A compensation device (9) for vibrations of an angle variable in a printing material processing machine (1) having an associated actuator (6) which acts on the angle variable, the compensation device (9) receiving a signal representative of the angle variable characteristic, and the compensation device (9) generating an output signal for the actuator (6) is disclosed. The compensation device (9) has at least one filter (13) in the form of a transfer function or a sum of transfer functions whose frequency parameters correspond to the vibration frequencies to be compensated, through whose effect the output signal of the compensation device (9) is obtained from the signal at at least one of the discrete frequencies to be compensated.

15 Claims, 5 Drawing Sheets

U.S. PATENT DOCUMENTS

| | | | |
|---|---|---|---|
| 5,369,348 A | 11/1994 | Gennesseaux | 318/623 |
| 5,379,210 A | 1/1995 | Grujic et al. | 700/28 |
| 5,404,418 A | 4/1995 | Nagano | 388/806 |
| 5,595,117 A | 1/1997 | Chrigui | 101/216 |
| 5,596,931 A | 1/1997 | Rossler et al. | 101/484 |
| 5,610,491 A | 3/1997 | Gotz et al. | 318/625 |
| 5,666,038 A | 9/1997 | Ohishi | 318/625 |
| 5,720,222 A | 2/1998 | Reichardt et al. | 101/216 |
| 5,872,439 A | 2/1999 | Nomura | 318/632 |
| 5,924,362 A | 7/1999 | Volz et al. | 101/183 |
| 5,927,195 A | 7/1999 | Volz et al. | 101/183 |
| 5,988,063 A | 11/1999 | Brandenburg et al. | 101/219 |
| 6,000,298 A | 12/1999 | Kato | 74/569 |
| 6,014,285 A | 1/2000 | Okamura | 360/78.04 |
| 6,095,073 A * | 8/2000 | Burkett | 114/61.1 |
| 6,196,345 B1 | 3/2001 | Lyons et al. | 180/65.8 |
| 6,274,995 B1 | 8/2001 | Kemer | 318/611 |
| 6,281,650 B1 | 8/2001 | Yutkowitz | 318/561 |
| 6,349,642 B1 | 2/2002 | Olomski et al. | 101/183 |
| 6,401,620 B1 | 6/2002 | Buck et al. | 101/484 |
| 6,427,590 B1 | 8/2002 | Rossler et al. | 101/181 |
| 6,472,840 B1 | 10/2002 | Takahashi | 318/649 |
| 6,487,524 B1 | 11/2002 | Preuss | 702/196 |
| 6,493,689 B2 | 12/2002 | Kotoulas et al. | 706/23 |
| 6,526,888 B2 | 3/2003 | Douillard et al. | 101/484 |
| 6,560,059 B1 | 5/2003 | Hsin et al. | 360/78.04 |
| 6,567,758 B1 * | 5/2003 | Wuori | 702/56 |
| 6,647,874 B1 | 11/2003 | Siegl et al. | 101/211 |
| 6,796,183 B2 | 9/2004 | Noell | 73/593 |

FOREIGN PATENT DOCUMENTS

| | | |
|---|---|---|
| DE | 692 12 073 T2 | 12/1992 |
| DE | 43 22 744 A1 | 1/1995 |
| DE | 197 40 153 A1 | 3/1999 |
| DE | 199 14 627 A1 | 10/2000 |
| DE | 101 49 525 A1 | 5/2002 |
| EP | 0 425 352 B1 | 5/1991 |
| EP | 0 469 617 A1 | 2/1992 |
| EP | 0 516 537 A1 | 12/1992 |
| EP | 0 882 588 A1 | 12/1998 |
| EP | 1 040 917 A1 | 10/2000 |
| EP | 1 202 147 B1 | 12/2004 |

* cited by examiner

COMPENSATION OF CYLINDER VIBRATION IN PRINTING MATERIAL PROCESSING MACHINES

This application is a continuation of U.S. patent application Ser. No. 10/417,284 filed Apr. 16, 2003 and hereby incorporated by reference herein. Priority to German Patent Application No.102 17 707.4, filed Apr. 17, 2002 and hereby incorporated by reference herein, is claimed.

BACKGROUND INFORMATION

The present invention relates to a compensation device for vibrations of an angle variable in a printing material processing machine, having an associated actuator which affects the angle variable, the compensation device being supplied with a signal which is representative of the angle variable characteristic and the compensation device generating an output signal for the actuator.

Periodic noninteger orders of vibration in comparison with the machine frequency in an angle variable, an angle of rotation, or an angle signal of a cylinder in a printing material processing machine, in particular a sheet or web processing printing press, have a negative effect on the precision of successive printed objects on a printing material. These negative effects may result in printing problems, in particular so-called doubling. Such negative effects may become relevant in particular between mechanically isolated parts of a printing material processing machine, in particular two or more groups of printing units of a sheet processing printing press. The vibrations result in fluctuations in the angle of rotation differences at the circumferences of a first cylinder and a second cylinder, resulting in a corresponding change in the circumferential register to the sheet transfer angle directly at the transfer of sheets between the separately involved printing units.

For a printing press driven by individual electric motors, a regulating means using control circuits for each electric motor is disclosed in German Patent Application No.197 40 153 A1, for example, for compensating periodic vibrations. In this periodic compensation regulator, a torque setpoint which is sent to a final control element receives an additional torque which is determined by a compensation regulator which processes the setpoint-actual value difference or the difference is determined from the torque setpoint and the actual value of the angular velocity or the angle of rotation. In this procedure, a dynamic process model is necessary to ensure stability. This form of regulating the system is also associated with a high computational complexity. Furthermore, the sampling time must be selected to be so long that a multiple of the period of the vibrations to be compensated may be included, but this is problematic in the case of variable printing press speeds.

In German Patent Application No. 100 53 237. 1, having a filing date of Oct. 26, 2000, a process of compensating mechanical vibrations, in particular rotational vibrations on a machine shaft, a cylinder, or a signal calculated from one or more coordinate values of one or more axes of rotation, in particular the difference between coordinates of two real machine shafts is disclosed. The rotational vibrations are represented spectrally in discrete frequency components, and each component is compensated by an essentially harmonic moment of the same frequency and a certain amplitude and phase in that the harmonic moment is impressed directly on the machine shaft or indirectly via an actuator. The process in question requires knowledge of the reinforcements and phase shifts of the underlying process for the frequencies to be compensated in order to be able to introduce harmonic moments of appropriate intensities and phases.

BRIEF SUMMARY OF THE INVENTION

An object of the present invention is to reduce or eliminate unwanted vibrations of one cylinder or of multiple cylinders in printing material processing machines, in particular in printing presses.

According to the present invention, the compensation device for vibrations of an angle variable in a printing material processing machine having a respective actuator which affects the angle variable and is preferably downstream from the compensation device, has at least one filter in the form of a transfer function or a sum of transfer functions whose frequency parameters correspond to the vibration frequencies to be compensated, through whose effect the output signal of the compensation device is derived for the actuator on at least one of the discrete frequencies to be compensated from the signal which is supplied to the compensation device and is representative of the angle variable characteristic, or more precisely for the time characteristic or change in value of the angle variable over time. The angle variable may be an angle of rotation of a cylinder or an angle of rotation difference between a first cylinder and a second cylinder.

In general, the vibrations that occur may be represented discretely in the sense in which they are formed by superimposing vibrations having discrete frequencies. The vibrations that occur may be represented with sufficient accuracy by a finite number of vibrations. It is known that the resulting vibrations depend on the operating condition of the machine that processes the printing material. The printing speed is a parameter which has an especially great influence here.

The frequency parameters required for the compensation device according to the present invention are either preset or they are adjustable or variable during operation of the printing material processing machine. An adjustment may be made, for example, on the basis of the operating state as mapped in the machine control. The machine control may be effectively connected to the compensation device according to the present invention and may influence or alter the frequency parameters. The frequency parameters may depend on the speed in particular.

The compensation device according to the present invention may be used in a simple and advantageous manner for compensation of integer or noninteger orders of vibrations, based on the machine frequency. A precise knowledge of the process parameters is not necessary for this compensation device. Therefore, stability may be achieved even in the case of highly fluctuating processes (process parameters, process transfer functions). To ensure stability, it is necessary to know only the stability range of the process parameters. One embodiment of the compensation device includes a second-order filter involving a low computation complexity. The compensation device may be used in particular to advantage for compensation of vibrations whose energy is low in comparison with the energy of a rotational movement of the angle variable.

According to the present invention, the angle variable is acted upon by an actuator in a compensation process for vibrations of an angle variable in a printing material processing machine so that the vibrations of the angle variable are reduced, a signal representative of the angle variable characteristic being determined and sent to the compensation device for generating an output signal for the actuator. The output signal of the compensation device is obtained from the signal at at least one of the discrete frequencies to be compensated by the action of at least one filter in the form of a transfer function or a sum of transfer functions whose frequency parameter corresponds to the vibration frequencies to be compensated.

In a preferred embodiment of the compensation device according to the present invention, the transfer function is harmonic for each of the frequencies to be compensated, i.e., it is a sine- or cosine-shifted function or a corresponding phase-shifted function. The transfer functions are each represented in the Laplace range (S range for continuous signals) or the Z range. The basic mathematical properties of the Laplace transform and the Z transform are summarized, e.g., in Taschenbuch der Mathematik [Handbook of Mathematics] by I. N. Bronstein and K. A. Semendjajew, 24th edition, Harri Deutsch, Thun and Frankfurt am Main, Germany, 1989.

The representative signal for the angle variable characteristic may be a time series, a signal train determined or sampled at certain points in time. In other words, the representative signal may be composed of a series (preferably ordered in time) of measured values of the angle variable at different points in time. The instantaneous angle variable characteristic may be known at discrete interpolation points. As an alternative, a continuous representative signal may also be generated. A representative signal may be generated by an angle position transducer. It may be sent to a compensation device either directly or indirectly, i.e., unprocessed and/or unmodified or processed and modified. A processing (modification) may be necessary for example to compensate for systematic errors in measurement (calibration). The sampling interval in the procedure according to the present invention may be independent of the period of the vibration to be compensated and is preferably independent.

The compensation device includes in an advantageous embodiment a computing device in which a program runs, this program having at least one section in which the output signal is obtained from the representative signal under the influence of the transfer function on the representative signal. In other words, the transfer function may be stored in a memory, and a program has steps according to a computation procedure for how the output signal is to be obtained from the representative signal by transformation. In particular, the present invention provides for calculation of the output signal as a differential equation corresponding to the transfer function from values of the input signal at one or more points in time and optionally from values of the output signal at one or more preceding points in time.

In a refinement of the present invention, to ensure the stability of the compensation device, at least one linear phase shift element is provided upstream or downstream from the filter. The filter and the phase shift element may also be integrated. In other words, the phase shift element may also be contained in the filter. The phase shift element may act on a discrete frequency, on a plurality of discrete frequencies or on a continuum of frequencies. In other words, a phase shift element may be provided for each frequency to be compensated or one phase shift element may act on at least a number of frequencies to be compensated.

As an alternative to the use of a phase shift element, the stability of the compensation may also be ensured through the choice of the phase of the harmonic transfer function.

In a regulating device for an angle variable in a printing material processing machine having an angle variable sensor, a regulating element and an actuator which affects the angle variable, the compensation device according to the present invention for vibrations of an angle variable may be assigned to the regulating element in such a way that the output signal of the compensation device is superimposed on the output signal of the regulating element. In the regulating device according to the present invention, the representative signal may represent the value of the angle variable or the value of the change in the angle variable or the value of the acceleration in the angle variable. The regulating element preferably has an input for actual values of the representative signal of the angle variable and an input for setpoint values of the representative signal of the angle variable.

In other words, a regulating process according to the present invention for an angle variable in a printing material processing machine by action on the angle variable with an actuator so that differences between the actual values and setpoints of the angle variable are reduced includes compensation for vibrations in the angle variable by a compensation process according to the present invention.

A printing unit according to the present invention in a printing material processing machine having at least one cylinder is also related to the compensation device and the regulating device according to the present invention. It is characterized by a compensation device according to the present invention and/or a regulating device according to the present invention which is associated with the cylinder. As an alternative, in a printing material processing machine having at least one first cylinder and one second cylinder, a printing unit according to the present invention may have a compensation device according to the present invention and/or a regulating device according to the present invention associated with the first cylinder and the second cylinder.

A printing unit group includes a plurality of printing units. The printing units of a printing unit group are preferably adjacent to one another. In other words, the printing material goes from one printing unit to the other printing unit along its transport path through the printing press. A printing unit group according to the present invention in a printing material processing machine having at least one first cylinder in a first printing unit and a second cylinder in a second printing unit includes a compensation device according to the present invention and/or a regulating device according to the present invention associated with the first cylinder and the second cylinder.

An improved synchronization of the first and second cylinders may be achieved in particular by reducing the vibrations. This is especially advantageous for the sheet transfer between two mechanically separated cylinders of two printing units, between two printing units in a printing unit group or between two printing unit groups in a sheet processing printing press.

The compensation device according to the present invention or the regulating device according to the present invention may be used in a printing press having an integrated gear train or in a printing press having a separate gear train. In other words, there may be separation points between the printing units or the printing unit groups in a printing press, where the drives of the printing units or the printing unit groups are separated from one another. The printing units or the printing unit groups, as seen individually, may have one or more drives.

A printing press according to the present invention has at least one printing unit according to the present invention and/or one printing unit group according to the present invention. In addition, as an alternative to that, in the case of a printing press according to the present invention having one or more separation points, each forming boundaries between printing units or printing unit groups over which the printing material is transferred between cylinders that are not mechanically synchronized with precision, each having a first cylinder and a second cylinder per separation point, with the separation point being situated between them, the printing press may have a compensation device according to the present invention and/or a regulating device according to the present invention which is associated with the first cylinder and the second cylinder.

In other words, a printing press according to the present invention having at least one first cylinder and one second cylinder which is mechanically separated from the first cylinder is characterized by a compensation device according to the present invention which is associated with the first cylinder and the second cylinder and/or a regulating device according to the present invention which is associated with the first cylinder and the second cylinder. A printing press according to the present invention having at least one first cylinder may be characterized by a compensation device according to the present invention which is associated with the first cylinder and/or a regulating device according to the present invention which is associated with the first cylinder.

The printing press may be a web (roll) processing machine or a sheet processing machine. The machine may print by various processes. In particular, the printing process may be direct or indirect flatbed printing, offset printing, flexographic printing, or the like. Typical printing materials include paper, paperboard, cardboard, organic polymer films, or the like.

BRIEF DESCRIPTION OF THE DRAWINGS

Additional advantages and advantageous embodiments and refinements of the present invention are presented on the basis of the following figures as well as the descriptions thereof, in which.

DETAILED DESCRIPTION

Figure 1:
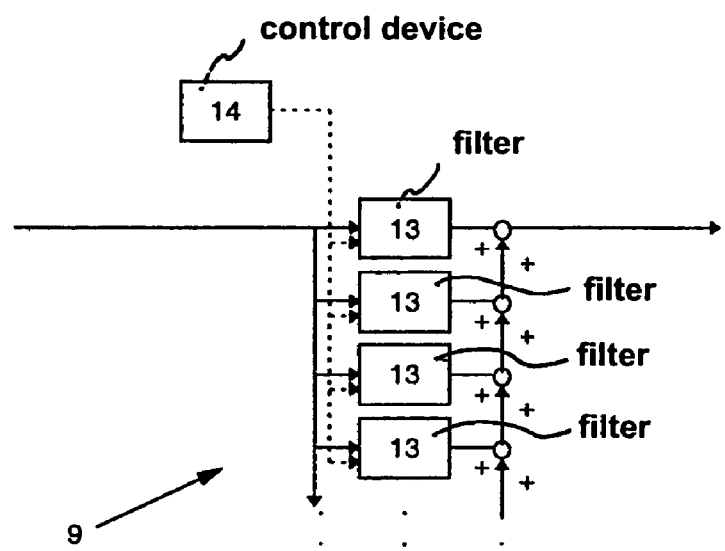
FIG. 1 shows a schematic diagram of the structure of a compensation device according to the present invention.

FIG. 1 shows a schematic diagram of the design of a compensation device according to the present invention. Before describing this simple embodiment, a few basic remarks should be made.

In the compensation device according to the present invention, a signal is influenced. The compensation device preferably contains a harmonic transfer function whose angular frequency corresponds to the angular frequency $\omega_n$ to be compensated. In particular, the harmonic transfer function may be a cosine transfer function or a sine transfer function or a weighted sum of a cosine transfer function and a sine transfer function. Without restriction to a specific transfer function of the general transfer functions, let us first consider a cosine transfer function for the purpose of illustration. In the Laplace range, the cosine transfer function of the compensation device is as follows:

$$G_{Rn}(s) = k_n \frac{s}{s^2 + \omega_n^2} \quad (1)$$

with two poles $S_{1/2} = \pm i \cdot \omega_n$ on the imaginary axis at the angular frequency $\omega_n$ to be compensated and thus it is based on an internal model principle (i is the imaginary unit). Therefore, no precise knowledge of the process is necessary. The process here is the transfer function from the output of compensation device 9 to the input of compensation device 9. In typical suitable designs, a phase shift of −90° is achieved only at an angular frequency greater than 100 s$^{-1}$. According to the principle of the internal model principle, sinusoidal interference is then completely eliminated (in other words, made equal to a setpoint of 0) when a model of the interference is contained in the compensation device and the closed compensation circuit is stable. For sampled systems having a sampling interval T, the cosine transfer function in the Z range is $$G_{Rn}(z^{-1}) = k_n \frac{1 - b_n z^{-1}}{1 - 2b_n z^{-1} + z^{-2}} \quad (2)$$

where $$b_n = \cos(\omega_n T). \quad (3)$$

No holding term is modeled in equation (2). For each sampling step k, output variable y(k) of the compensation device may be determined from input variable u(k) of time increments k and k-1 and from output variable y(k) of time increments k-1 and k-2 according to the calculation procedure $$y(k) = k_n(u(k) - b_n u(k-1)) + 2b_n y(k-1) - y(k-2). \quad (4)$$

In this connection it is clear that the order of the angular frequency to be compensated may be either integer or noninteger. For compensation of a speed-independent machine order r, the respective angular frequency is $$\omega_n = 2\pi \cdot r \cdot v / 3600, \quad (5)$$

where v denotes the average machine speed in prints per hour and the order r indicates the ratio of the vibration frequency to be compensated to the printing frequency of the machine. A printing material processing machine typically has a regulator which has the average machine speed as the setpoint speed. For compensation of fixed orders r, parameter $b_n$ must be recalculated according to equation (3) in equations (1), (2) and/or (4) when there is a change in the average machine speed and/or the speed setpoint. The compensation device succeeds in eliminating sinusoidal interference without a complex calculation of trigonometric functions and may therefore be used in conjunction with simple regulating processors. When using a harmonic transfer function having a fixed phase such as the cosine or sine transfer function, stability is achieved with small gain factors in a 180° range of the process phase. With a suitable phase shift element, the process phase may be adapted to always be in this stable range.

With regard to the required stability of the closed compensation circuit, it should be pointed out that the transfer function has an infinitely high gain for angular frequency $\omega_n$ and a gain which is a function of $k_n$ for other frequencies, this gain decreasing with the difference between the angular frequency to be compensated and the frequency in question. Therefore, for a sufficiently small $k_n$, the analysis may be reduced to the angular frequency to be compensated. If the phase shift of the process is in a range of −90° to +90° for this frequency to be compensated, then stability is ensured by the reversal of signs in the compensation circuit. With a relatively rigid coupling of the actuator to the compensation shaft, this condition is usually met for small orders. If the phase shift is in a range of −180° to 0°, a +90° phase increase may be achieved by connecting a differentiating element upstream or downstream from the compensation device. This is expedient for higher orders in particular, because for them the process typically has a phase shift with a negative sign. Using a differentiating element corresponds to using a speed signal instead of an angle signal for compensation. Due to the connection of a phase shift element for the angular frequency to be compensated, it is possible to work in the stable range of −90° to +90° regardless of the order. Only an approximate knowledge of the frequency-dependent phase shift of the process is necessary for selection of the phase shift element. Fluctuations in the process parameters are therefore non-critical.

As an alternative to using a harmonic transfer function of a fixed phase in conjunction with a phase shift element which shifts the phase of the process into the stable range, stability may also be achieved even without a phase shift element by selecting the phase $\phi_n$ of a harmonic transfer function of the form $$G_{Rn}(s) = k_n \frac{s \cos\varphi_n + \omega_n \sin\varphi_n}{s^2 + \omega_n^2}. \quad (6)$$

Stability is achieved even when the phase of the process fluctuates by ±90° for small values of $k_n$ and selection of $\phi_n$ according to the measured phase $\hat{\phi}_P$ of the process at the compensation frequency. In other words, by selecting the phase of the harmonic transfer function as a function of the phase of the process at the compensation frequency, it is possible to locate the stable range of 180° in such a way that the measured phase of the process is within this range. If the phase of the harmonic transfer function is selected to be equal to the measured phase of the process at the compensation frequency, then this is in the middle of the stable range of 180°.

According to the internal model principle, the compensation formula according to the present invention having a harmonic transfer function is also applicable in general for a plurality of transfer functions $G_R$ for time-continuous or time-discrete signals which contain a sine or cosine transfer function as a component, and therefore are able to generate the harmonic signal component of angular frequency $o_n$, necessary for compensation. In particular, compensation is also possible with the following cosine transfer functions or with the following sine transfer functions, optionally with a phase shift element $G_v(z)$ which ensures stability: Cosine transfer function in the s range $$G_K(s) = k_R \frac{s}{s^2 + \omega_n^2}$$

with static gain 0; cosine transfer function in the z range with holding element $$HG_K(z) = k_R \frac{\sin\omega_n T}{\omega_n} \cdot \frac{z^{-1} - z^{-2}}{1 - 2z^{-1}\cos\omega_n T + z^{-2}}$$

with static gain 0 (where $HG_K(z) \hat{=} G_K(s)$); cosine transfer function in the z range $$G_K(z) = k_R T \frac{1 - z^{-1}\cos\omega_n T}{1 - 2z^{-1}\cos\omega_n T + z^{-2}}$$

with static gain $$\frac{k_R T}{2} \text{(where } G_K(z) \approx HG_K(z)\text{);}$$

and cosine transfer function in the z range without a holding element and without static gain $$G_{Ko}(z) = \frac{k_R T}{2} \frac{1 - z^{-2}}{1 - 2z^{-1}\cos\omega_n T + z^{-2}} \left(\text{where } G_{Ko}(z) = G_K(z) - \frac{k_R T}{2}\right).$$

For small sampling intervals T, the compensation effect of $G_K(z)$ corresponds to that of $G_K(s)$ and $HG_K(z)$. However, the static gain (for $\omega \to 0$) of $G_K(z)$ is not 0 but instead is $$\frac{k_R t}{2},$$

with the possibility of an unwanted influence on regulation of the machine. By subtracting the static gain from $G_K(z)$, this yields $G_{Ko}(z)$ with a static gain of 0.

Sine transfer function in the s range $$G_S(s) = k_R \frac{\omega_n}{s^2 + \omega_n^2} \text{ with static gain } \frac{k_R}{\omega_n};$$

sine transfer function in the s range without static gain $$G_{So}(s) = -\frac{k_R}{\omega_n} \cdot \frac{s^2}{s^2 + \omega_n^2} \left(\text{where } G_{So}(s) = G_S(s) - \frac{k_R}{\omega_n}\right);$$

sine transfer function in the z range with a holding element $$HG_S(z) = k_R \frac{1-\cos\omega_n T}{\omega_n} \cdot \frac{z^{-1}+z^{-2}}{1-2z^{-1}\cos\omega_n T + z^{-2}}$$

with static gain $$\frac{k_R}{\omega_n} \text{ (where } HG_S(z) \triangleq G_S(s));$$

sine transfer function in the z range with a holding element without static gain $$HG_{So}(z) = -\frac{k_R}{\omega_n} \cdot \frac{1-z^{-1}(1+\cos\omega_n T) + z^{-2}\cos\omega_n T}{1-2z^{-1}\cos\omega_n T + z^{-2}}$$

$$\left(\text{where } HG_{So}(z) = HG_S(z) - \frac{k_R}{\omega_n}\right);$$

sine transfer function in the z range without a holding element $$G_S(z) = k_R T \frac{z^{-1}\sin\omega_n T}{1-2z^{-1}\cos\omega_n T + z^{-2}}$$

with static gain $$\frac{k_R T}{2}\cot\frac{\omega_n T}{2} \text{ (where } G_S(z) \approx HG_S(z));$$

and sine transfer function in the z range without a holding element and without static gain $$G_{So}(z) = -\frac{k_R T}{2}\cot\frac{\omega_n T}{2} \cdot \frac{1-2z^{-1}+z^{-2}}{1-2z^{-1}\cos\omega_n T + z^{-2}}$$

$$\left(\text{where } G_{So}(z) = G_S(z) - \frac{k_R T}{2}\cot\frac{\omega_n T}{2}\right).$$

For compensation, output variable y(k) of the compensation device may be calculated recursively using the z transfer function $$G_R(z) = k_R \frac{b_0 + b_1 z^{-1} + b_2 z^{-2}}{1 + a_1 z^{-1} + a_2 z^{-2}} \quad (7)$$

in each sampling step k from the preceding output variables y(k−1) and y(k−2) as well as current input variable u(k) and previous input variables u(k−1) and u(k−2) according to the equation $$y(k) = k_R(b_0 u(k) + b_1 u(k-1) + b_2 u(k-2)) - a_1 y(k-1) - a_2 y(k-2)$$

Without the phase shift element $G_v(z)$, stability is achieved at a small $k_R$ with the cosine transfer function approximately for phase shifts $\phi_P$ of the process at the compensation angular frequency of −90° to +90° and with the sine transfer function approximately for phase shifts $\phi_P$ of the process at the compensation angular frequency of 0° to +180°. The sine transfer functions without the phase shift element thus act like the cosine transfer functions with negative differential quotient $$G_V(z) = -\frac{1-z^{-1}}{T}$$

generating a phase shift of −90° as the phase shift element. In other words, the transfer functions may be converted one into one another by using a suitable phase shift element. For example, the cosine transfer function without a holding element with this phase shift element $$G_V(z)G_K(z) = -k_R \frac{1-z^{-1}(1+\cos\omega_n T) + z^{-2}\cos\omega_n T}{1-2z^{-1}\cos\omega_n T + z^{-2}} \quad (9)$$

$$= \omega_n \cdot HG_{So}(z)$$

corresponds directly to the sine transfer function $HG_{So}(z)$ with a holding element without static gain except for the factor $\omega_n$. Whether the cosine transfer function or the sine transfer function is more suitable without the use of an additional phase shift element depends on the process taking place on a printing material processing machine.

Without the use of a phase shift element, stability is also achievable by selecting cosine or sine transfer functions for compensation with one of the + and − signs, e.g., by $$G_R(z) = \begin{cases} G_K(z) & -45° \leq \hat{\varphi}_P < +45° \\ G_S(z) & +45° \leq \hat{\varphi}_P < +135° \\ -G_K(z) & \hat{\varphi}_P < -135° \text{ or } \hat{\varphi}_P \geq 135° \\ -G_S(z) & -135° \leq \hat{\varphi}_P < -45° \end{cases}$$

where $\hat{\phi}_P$ is the phase shift $\phi_P$ of the process measured in the range of −180° to +180°. possibilities ensure stability for small gain factors $k_R$. For large $k_R$ factors, whether stability is achieved will depend on the process.

In an advantageous refinement of this method, maximum stability of the process with respect to fluctuations in phase shift $\phi_P$ of the process is achievable at low gain factors $k_R$ even without a phase shift element for any desired phase shifts of the process through a simultaneous application of the sine and cosine transfer functions which is weighted in accordance with the measured phase shift $\hat{\phi}_P$ of the process at the compensation frequency. To do so, the cosine transfer function is weighted with $\cos\hat{\phi}_P$ and a respective sine transfer function is weighted with $\sin\hat{\phi}_P$. In this weighting, stability of the compensation is ensured even with a phase shift $\phi_P$ of the process fluctuating about ±90° at the compensation frequency in comparison with the measured $\hat{\phi}_P$, while the compensation reaches a steady state at a given gain factor at the maximum rate if $\hat{\phi}_P = \phi_P$, i.e., if the measured phase shift and the actual phase shift of the process at the compensation frequency are identical.

For the cosine transfer function in the z range as given above without a holding element and the corresponding sine transfer function, this yields, e.g., the following as the resulting harmonic transfer function:

$$G(z) = G_K(z)\cos\hat{\varphi}_P + G_S(z)\sin\hat{\varphi}_P \quad (10)$$

$$= k_R T \frac{(1 - z^{-1}\cos\omega_n T)\cos\hat{\varphi}_P + (z^{-1}\sin\omega_n T)\sin\hat{\varphi}_P}{1 - 2z^{-1}\cos\omega_n T + z^{-2}}$$

and for the z transfer function without a holding element and without a static gain $$G_o(z) = G_{Ko}(z)\cos\hat{\varphi}_P + G_{So}(z)\sin\hat{\varphi}_P \quad (11)$$

$$= \frac{k_R T}{2} \cdot \frac{(1 - z^{-2})\cos\hat{\varphi}_P - \cot\frac{\omega_n T}{2}(1 - 2z^{-1} + z^{-2})\sin\hat{\varphi}_P}{1 - 2z^{-1}\cos\omega_n T + z^{-2}}.$$

For the resulting z transfer functions with holding element, this yields accordingly $$HG(z) = HG_K(z)\cos\hat{\varphi}_P + HG_S(z)\sin\hat{\varphi}_P \quad (12)$$

$$= \frac{k_R}{\omega_n} \cdot \frac{(\sin\omega_n T)(z^{-1} - z^{-2})\cos\hat{\varphi}_P + (1 - \cos\omega_n T)(z^{-1} + z^{-2})\sin\hat{\varphi}_P}{1 - 2z^{-1}\cos\omega_n T + z^{-2}}$$

and $$HG_o(z) = HG_K(z)\cos\hat{\varphi}_P + HG_{So}(z)\sin\hat{\varphi}_P \quad (13)$$

$$= \frac{k_R}{\omega_n} \cdot \frac{(\sin\omega_n T)(z^{-1} - z^{-2})\cos\hat{\varphi}_P - (1 - (1 + \cos\omega_n T)z^{-1} + (\cos\omega_n T)z^{-2})\sin\hat{\varphi}_P}{1 - 2z^{-1}\cos\omega_n T + z^{-2}}$$

and for the transfer functions in the s range for continuous signals $$G(s) = G_K(s)\cos\hat{\varphi}_P + G_S(s)\sin\hat{\varphi}_P \quad (14)$$

$$= k_R \frac{s \cdot \cos\hat{\varphi}_P + \omega_n \cdot \sin\hat{\varphi}_P}{s^2 + \omega_n^2}$$

and $$G_o(s) = G_K(s)\cos\hat{\varphi}_P + G_{So}(s)\sin\hat{\varphi}_P \quad (15)$$

$$= k_R \frac{s \cdot \cos\hat{\varphi}_P - \frac{s^2}{\omega_n} \cdot \sin\hat{\varphi}_P}{s^2 + \omega_n^2}.$$

The ratio of the sine and cosine transfer functions belonging together $$\lim_{\omega \to \omega_n} \frac{G_K(s)}{G_S(s)} = \lim_{\omega \to \omega_n} \frac{G_K(s)}{G_{So}(s)}$$

$$= \lim_{\omega \to \omega_n} \frac{HG_K(z)}{HG_S(z)}$$

$$= \lim_{\omega \to \omega_n} \frac{HG_K(z)}{HG_{So}(z)}$$

$$= \lim_{\omega \to \omega_n} \frac{G_K(z)}{G_S(z)}$$

$$= \lim_{\omega \to \omega_n} \frac{G_{Ko}(z)}{G_{So}(z)} = i$$

at the compensation frequency is imaginary unit i, so that these functions are mutually orthogonal there and have the same absolute value. Harmonic total transfer functions are obtained through the selected weighted addition of these functions and are coordinated for a process having phase shift $\hat{\varphi}_P$ at the compensation frequency.

For the decay constant $T_A$, which indicates how much time elapses before the amplitude of the interference has dropped to $e^{-1} \approx 37\%$, it then holds that $$T_A \approx \frac{2}{k_R k_P}$$

for $k_R$ when the gain $\hat{k}_P = k_P$ is known precisely and with phase shift $\hat{\varphi}_P = \varphi_P$ of the process.

However, when using the cosine transfer functions given above, the equation $$T_{AK} \approx \frac{2}{k_R k_P \cos\varphi_P}$$

holds with asymptotic stability, and when using the sine transfer functions given above, the equation $$T_{AS} \approx \frac{2}{k_R k_P \sin\varphi_P}$$

holds.

These equations allow an unambiguous parameterization of compensation as a function of measured gain $\hat{k}_P$ and phase shift $\hat{\varphi}_P$ of the process as well as selectable decay constant $T_A$.

FIG. 1 shows an embodiment of a compensation device 9 having a plurality of filters 13 that operate in parallel and have harmonic transfer functions, each having different frequency parameters corresponding to a vibration to be compensated. The signal representing an angle variable characteristic and having vibrations to be compensated is sent to the input of this filter 13. The outputs of filters 13 are added up. The sum thus forms the total output of compensation device 9. Controller 14 of the printing material processing machine is connected to filters 13. The orders to be compensated are, if necessary, predetermined and/or calculated by controller 14 as a function of the speed. The parameters of the harmonic transfer functions, in particular the $b_n$ parameters according to equation (3), may be determined in controller 14 or in a processor of compensation device 9. It is also possible for controller 14 to specify fixed angular frequencies instead of orders and/or to determine the angular frequencies using measurement equipment on the printing material processing machine, if fixed-frequency interference occurs.

Figure 2:
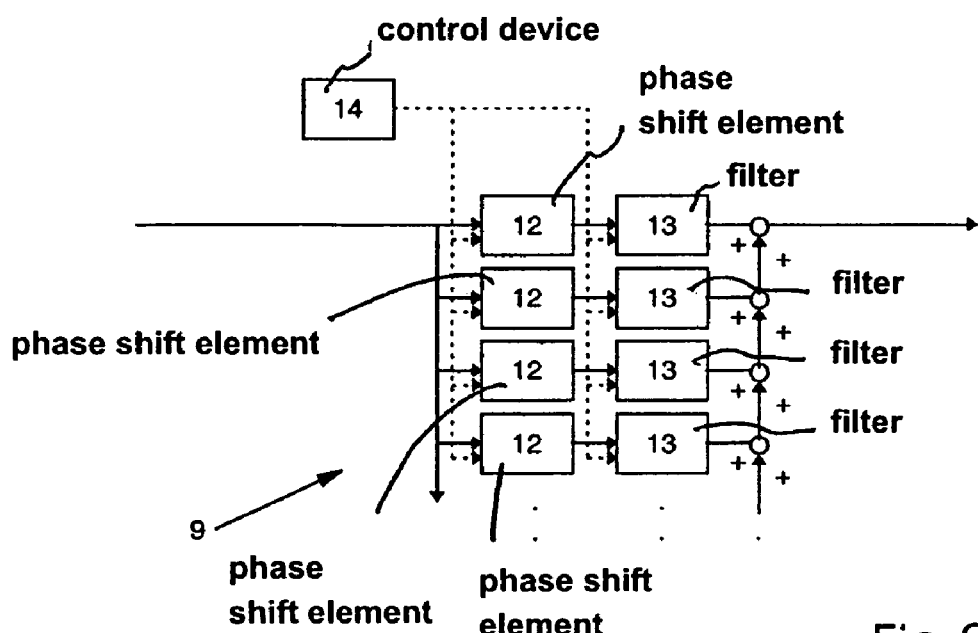
FIG. 2 shows a schematic diagram of an advantageous refinement of the design of the compensation device according to the present invention.

FIG. 2 shows a schematic diagram of an advantageous refinement of the design of a compensation device according to the present invention. Phase shift elements 12 are connected upstream from filters 13 having a transfer function. A phase shift element 12 is preferably a linear element, which influences the phase at the angular frequency of filter 13 downstream from the phase shift element 12. It should be pointed out here that the phase shift element 12 is able to influence the phase only at the angular frequency which is to be compensated or is able to influence phases for any angular frequencies, depending on the design. Of course, only the phase shift for the angular frequency which is to be compensated is relevant. Controller 14 determines the structure or parameters of the phase shift element 12, in particular the angular frequency and the absolute value and direction of the phase shift. Simple transfer functions of the phase shift may be, for example, the identity, i.e., factor 1 (no phase shift) or a differentiation (phase shift by +90°) or an inversion (phase shift by +180°) or an inversion of the differentiation (phase shift by −90°). In a very simple refinement, the choice of the two possibilities, namely factor 1 or differentiation, is provided by the controller. In an extensive refinement, phase shift elements 12 for any desired phase shifts are adjustable in the entire angular range between 0° and 360°, depending on the phase shift generated by the process. When using a cosine transfer function, a phase shift element having a phase shift adjustable from 0° to +90° is preferred.

Figure 3:
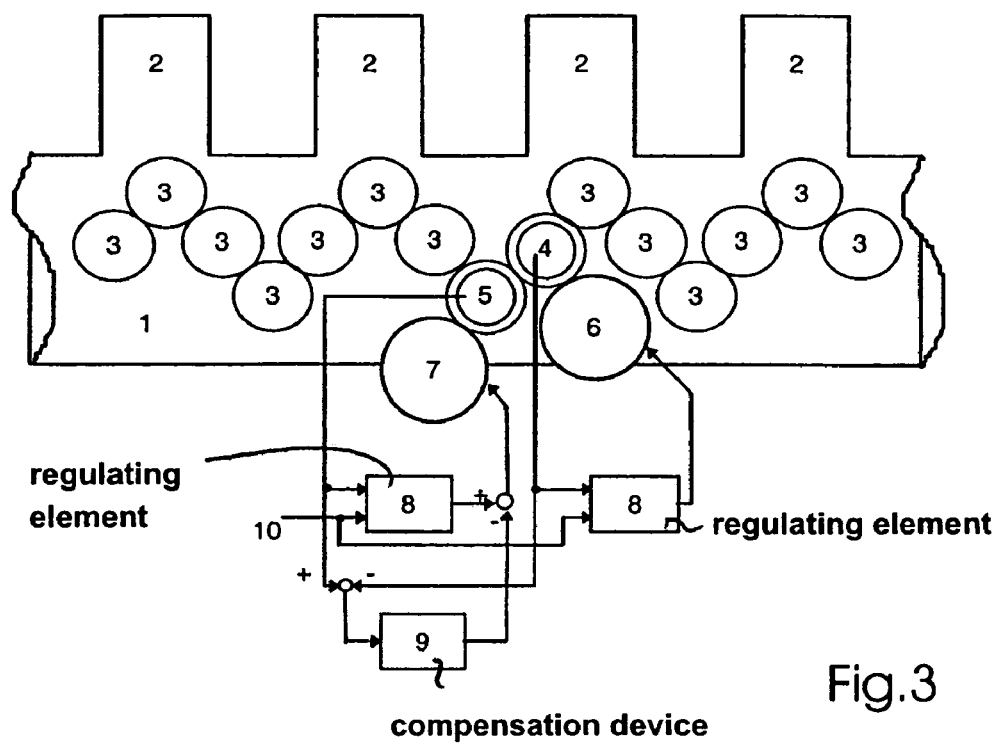
FIG. 3 shows a detail of a printing material processing machine having a separate gear train, two regulating devices and a vibration compensation according to the present invention.

FIG. 3 relates schematically to a detail of a printing material processing machine 1 having a separate gear train, two regulating devices and a vibration compensation according to the present invention. The advantageous embodiment shown here relates to a transfer point between two sheet-carrying cylinders, first cylinder 4 and second cylinder 5 in a sheet-fed printing press having a plurality of printing units 2 and cylinders 3. The gear train between first cylinder 4 and second cylinder 5 is separate. First cylinder 4 has angle regulation by a regulating element 8 and a first actuator 6, in a simple embodiment having one motor. Second cylinder 5 also has angle regulation by a regulating element 8 and a second actuator 7, in a simple embodiment having one motor. Representative signals for the angle variable characteristics (value of the angle variable) of the respective cylinders, e.g., obtained by angle position sensors, are sent to regulating elements 8. Regulating elements 8 may be simple differential regulators or regulators that include complex transformations (integrations, differentiations and the like). Actuators 6, 7 which act on the angle variables of the respective cylinders may in a first embodiment be the single drives of the respective cylinders, in a second embodiment they may be additional auxiliary drives for the respective cylinders which are moved by a main drive. A setpoint of the representative signal, angle variable setpoint 10, is sent to regulating elements 8. In conjunction with the description of the embodiments, only one angle variable setpoint is mentioned here and below. However, it is clear that different setpoints may be predetermined for the individual angle variables of the cylinders for each cylinder and sent to regulating elements 8 accordingly. To reduce or eliminate interfering orders of vibrations which have a negative effect on the reproducibility of sheet transfer between first cylinder 4 and second cylinder 5, the differential angle between cylinder 4 and cylinder 5 or a variable which depends thereon in a linear manner, being a measure of the differential angle, is sent to compensation element 8 (see subtraction point upstream from compensation element 9). The output signal of compensation element 9 is superimposed on the output signal of regulating element 8 (see subtraction point downstream from regulating element 8 of second cylinder 5). It is clear that as an alternative, this output signal may also be superimposed on the output signal of regulating element 8 of first cylinder 4. In the context presented here, it is clear that there are partial additions and partial subtractions of the individual signals. In an advantageous manner, only one compensation element 9 is needed in the embodiment presented here; with this compensation element, the interfering orders of vibrations may be removed directly from the target variable. This may be accomplished with a high precision.

Figure 4:
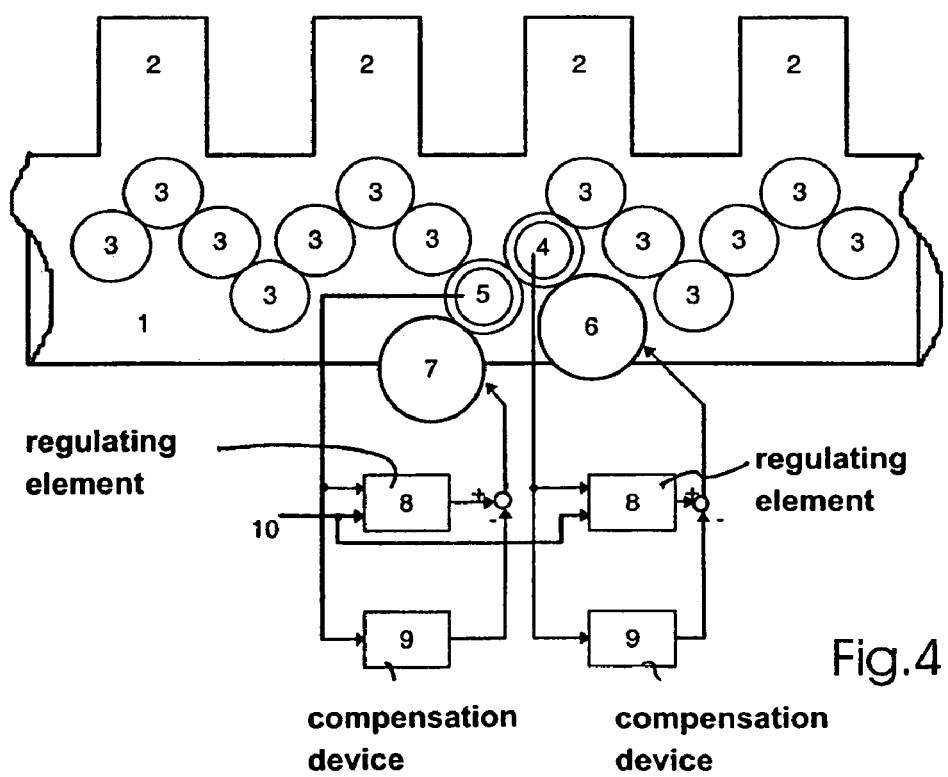
FIG. 4 shows a detail of an embodiment of a printing material processing machine having a separate gear train, two regulating devices and two vibration compensating devices according to the present invention.

FIG. 4 shows a schematic diagram of a detail of one embodiment of a printing material processing machine 1 which has a plurality of printing units 2 and a plurality of cylinders 3, each having separate gear trains, two regulating devices and two vibration compensation devices according to the present invention. In contrast with compensation of the angle difference in the embodiment illustrated in FIG. 3, the embodiment in this FIG. 4 has separate compensation of vibrations at the transfer point between first cylinder 4 and second cylinder 5 in the individual angle variables. In this embodiment, the reduction or elimination of absolute angle variable vibrations of cylinders 4, 5 is advantageous, optionally even of the two machine parts including the first and/or second cylinder in contrast with reduction or elimination of the relative angle variable vibrations in the embodiment according to FIG. 3. Compensation takes place directly in the target variables via two compensation elements 9, each being assigned to regulating element 8. This embodiment is symmetrical for first cylinder 4 and second cylinder 5. A regulating element 8 is assigned to each cylinder 4, 5 and receives a representative signal for the angle variable of the cylinder (value of the angle variable) and an angle variable setpoint 10. A compensation element 9 whose output signal is superimposed on the output signal of the regulating element (subtraction points after regulating elements 8) is provided in parallel with each regulating element 8. The superimposed signals are sent to first actuator 6 and/or second actuator 7.

Figure 5:
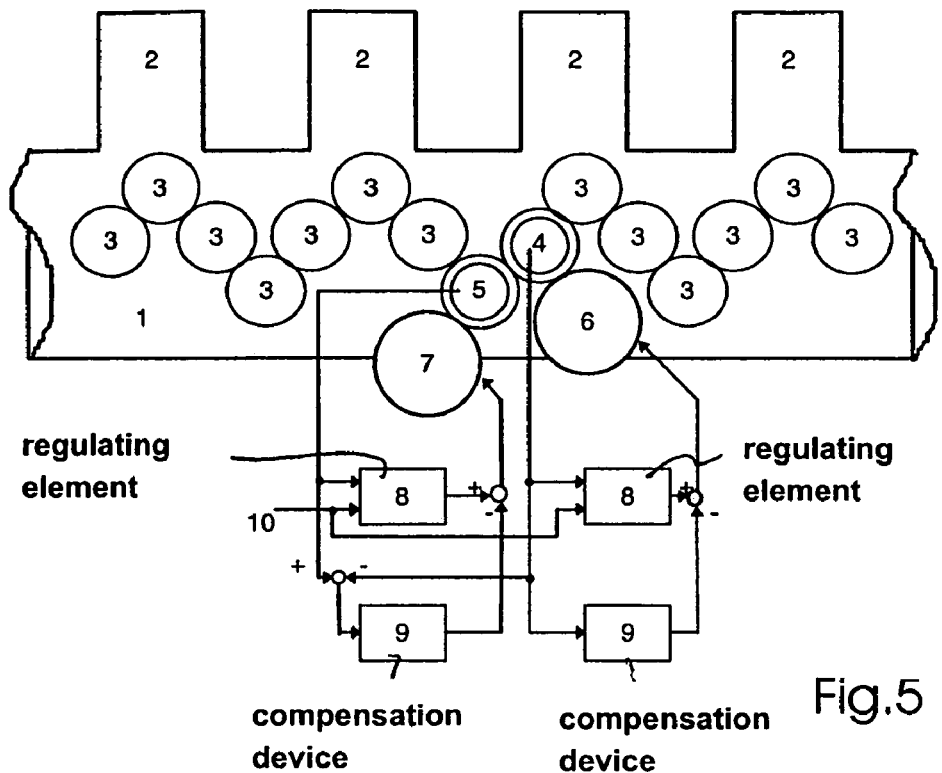
FIG. 5 shows a detail of an alternative embodiment of a printing material processing machine having a separate gear train, two regulating devices and two vibration compensating devices according to the present invention.

FIG. 5 shows a detail of an alternative embodiment of a printing material processing machine 1 which includes a plurality of printing units 2 and cylinders 3, having separate gear trains, two regulating devices and two vibration compensation devices according to the present invention. In this embodiment for compensation of vibrations at a transfer point between two sheet-carrying cylinders, there is separate compensation for first cylinder 4 and second cylinder 5, but there is also a relative compensation for the angular difference, shown here for second cylinder 5 as an example. This embodiment combines in an advantageous manner an absolute reduction in vibrations with the relative reduction in vibrations (relative angle variable for sheet transfer). A regulating element assigned to first cylinder 4 receives a representative signal for the angle variable of first cylinder 4 (value of the angle variable) and an angle variable setpoint 10. A compensation element 9 provided in parallel with regulating element 8 supplies an output signal, which is superimposed on the output signal of the regulating element at the subtraction point downstream from regulating elements. The superimposed signal is sent to first actuator 6. A regulating element 8 also provided for second cylinder 5 receives a representative signal for the angle variable of second cylinder (value of the angle variable) and an angle variable setpoint 10. The differential angle between cylinder 4 and cylinder 5, or a linear dependent variable which is a measure of the differential angle, is sent to compensation element 9 at a subtraction point. The output signal of compensation element 9 is superimposed on the output signal of regulating element 8 at a subtraction point downstream from regulating element 8 of second cylinder 5. The superimposed signal is sent to second actuator 7.

Figure 6:
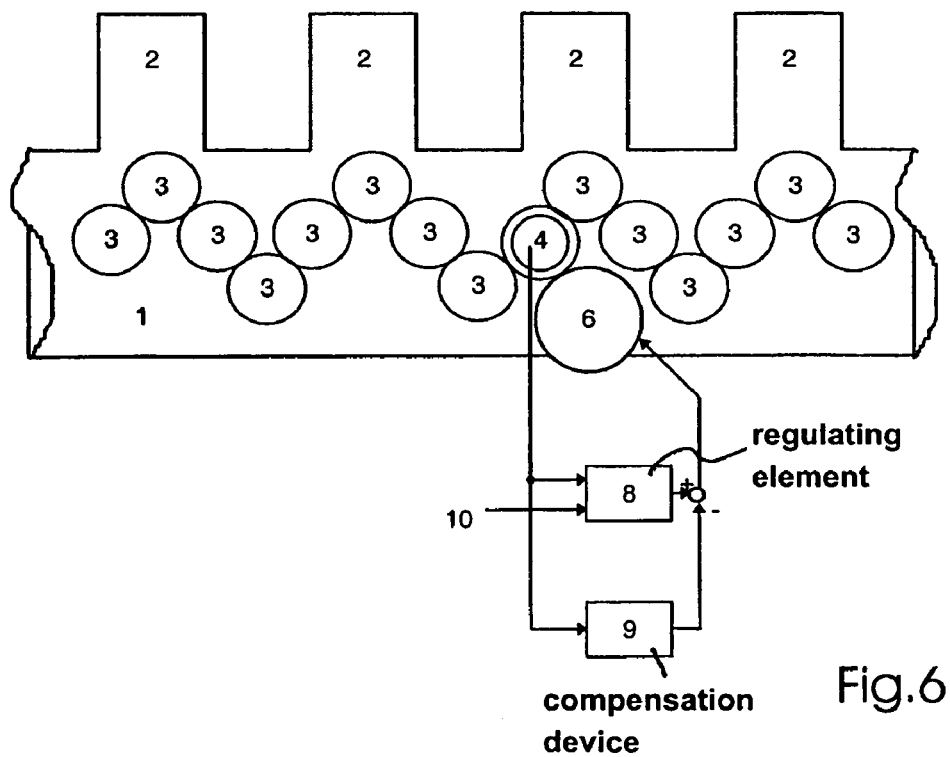
FIG. 6 shows a detail of an alternative embodiment of a printing material processing machine having a regulating device and a vibration compensating device according to the present invention for one cylinder.

FIG. 6 shows a detail of an alternative embodiment of a printing material processing machine 1 having a plurality of printing units and cylinders 3, a regulating device and a vibration compensation device according to the present invention for one cylinder. Printing material processing machine 1 of this embodiment may either have a continuous gear train or an interrupted gear train. Use of a compensation device 9 according to the present invention and use of a regulating device according to the present invention having regulating element 8 and compensation device 9 is not limited to reducing vibrations at the transfer points between sheet carrying cylinders but instead may be used in general for improved regulation, i.e., compensation of vibration of cylinders, e.g., printing block cylinders, transfer cylinders or rubber blanket cylinders or backpressure cylinders, as well as rolls and rollers in inking and/or damping systems. FIG. 6 shows an example of regulation having parallel compensation for a first cylinder 4. A representative signal for the angle variable characteristic (characteristic of the value of the angle variable over time) is generated by an angle position sensor and sent to regulating element 8 together with an angle variable setpoint 10. Regulating element 8 may be a simple differential regulator or a regulator which includes complex transformations (integrations, differentiations and the like). The signal representative of the angle variable characteristic is also sent in parallel to compensation element 9, whose output signal is superimposed on the output signal of regulating element 8 at the subtraction point downstream from regulating element 8. The superimposed signal is sent to first actuator 6. Since the frequency or frequencies of compensation element 9 to be compensated is/are adjustable, vibrations of an integer order may also be compensated in addition to vibrations of a non-integer order in comparison with the machine frequency.

Figure 7:
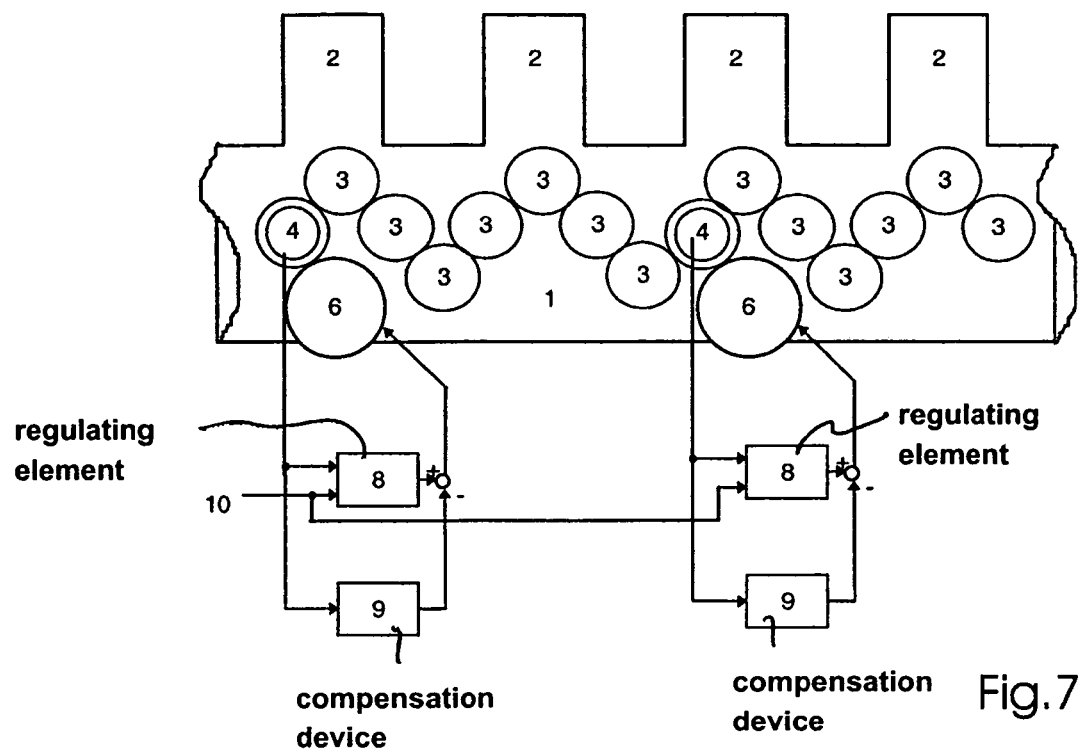
FIG. 7 shows a detail of an embodiment of a printing material processing machine having two cylinders, each cylinder being assigned a regulating device and a vibration compensation device according to the present invention.

FIG. 7 shows a detail of an embodiment of a printing material processing machine 1 having at least two printing units 2, each of which is assigned a regulating element 8 and a vibration compensation device according to the present invention in the form of a compensation element 9 for one cylinder. With such an embodiment, vibrations in the gear train may be reduced or even eliminated in an advantageous manner. Actuators 6, e.g., individual motors, are provided at various locations in the gear train to act on cylinders 4. To prevent an edge or flank change on gear wheels in the gear train, actuators 6 are to be regulated, e.g., through the choice of the average motor torque so that the flow of energy in printing material processing machine 1 does not change its plus or minus sign (direction) at any point. A regulating element 8 is assigned to each cylinder 4 and receives a representative signal for the angle variable of respective cylinder 4 (value of the angle variable) and an angle variable setpoint 10. In parallel with regulating element 8, a compensation element 9 is also provided, its output signal being superimposed on the output signal of regulating element 8 at the subtraction point downstream from regulating element 8. The superimposed signal is then sent to actuator 6.

Figure 8:
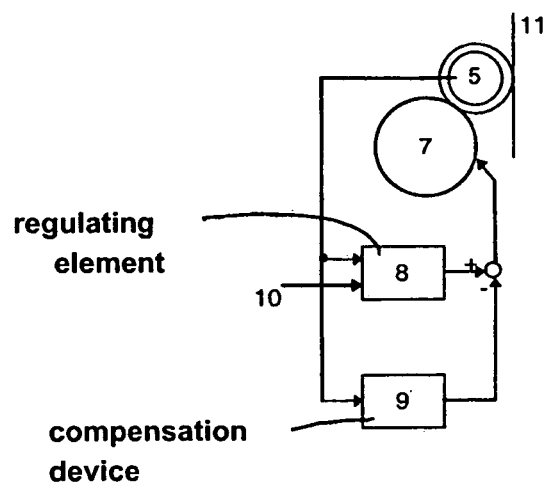
FIG. 8 shows an embodiment of a regulating device having a vibration compensation device according to the present invention for one cylinder of a rotary printing press.

FIG. 8 shows a schematic diagram of one embodiment of a regulating device having a vibration compensation device according to the present invention for a cylinder 5 of a rotary web printing press printing a web 11. This embodiment should illustrate the fact that use of the present invention is not limited to sheet-processing printing presses. A regulating element 8 is provided for cylinder 5 and receives a representative signal for the angle variable of cylinder 5 (value of the angle variable) and an angle variable setpoint 10. In parallel with regulating element 8, a compensation element 9 is also provided, its output signal being superimposed on the output signal of regulating element 8 at the subtraction point downstream from regulating element 8. The superimposed signal is sent to actuator 7. In addition to vibrations of noninteger order in comparison with the machine frequency, vibrations of an integer order may also be reduced or eliminated by compensation element 9 according to the present invention.

Figure 9:
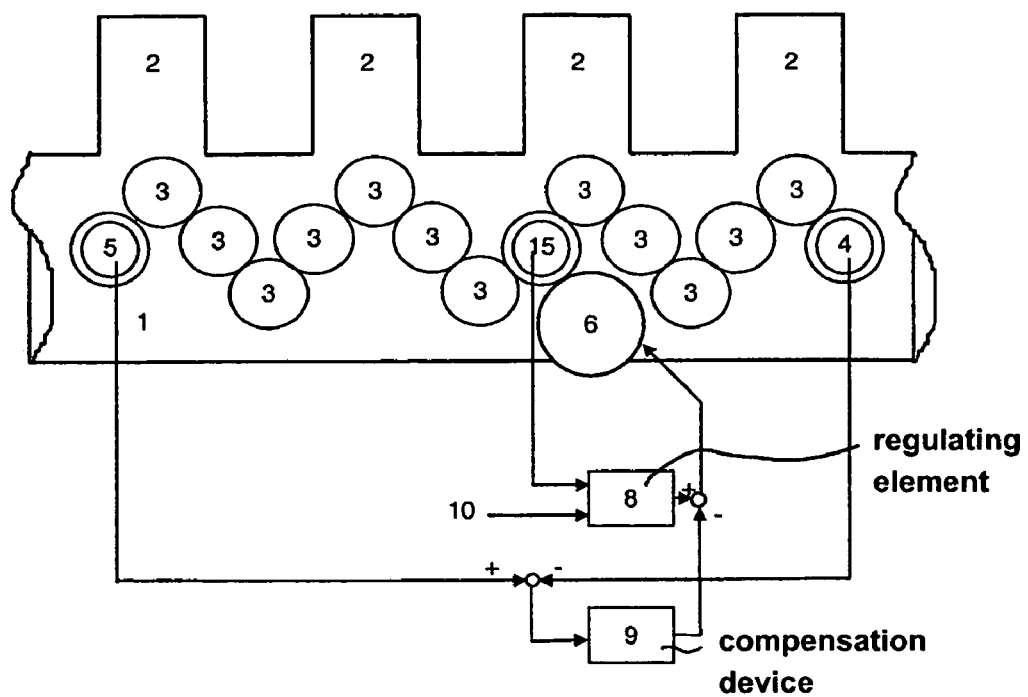
FIG. 9 shows a detail of another alternative embodiment of a printing material processing machine having a regulating device and a vibration compensation according to the present invention.

FIG. 9 shows a detail of another alternative embodiment of a printing material processing machine 1 having a regulating device and a vibration compensation device according to the present invention. This embodiment is especially advantageous for performing compensation of vibrations close to the first natural frequency in printing material processing machines without a separate gear train, because the first natural frequency (vibration antipodes at the open ends and a vibration node in between) may be largely eliminated here in the machine as a whole. The cylinders equipped with rotation sensors are situated in the vicinity of the ends of the machine. Printing material processing machine 1, having a plurality of printing units 2 and a plurality of cylinders 3, has a compensation device 9 to whose input the difference in the rotational angle position signals of the rotation sensors of first cylinder 4 and of second cylinder 5 is applied. The output signal of compensation device 9 is subtracted from the output signal of regulating element 8, to which the angle position signal of a third cylinder 15 to be compensated and an angle variable setpoint are sent. Regulation is accomplished via a first actuator 6, which acts on third cylinder 15. With an arrangement according to FIG. 9, the compensation result already intended in the embodiment according to FIG. 7 may be achieved with only one control element, e.g., the main motor in an advantageous manner using certain compensation arrangements, e.g., compensation arrangements having compensation frequencies in the vicinity of the first natural frequency.

Figure 10:
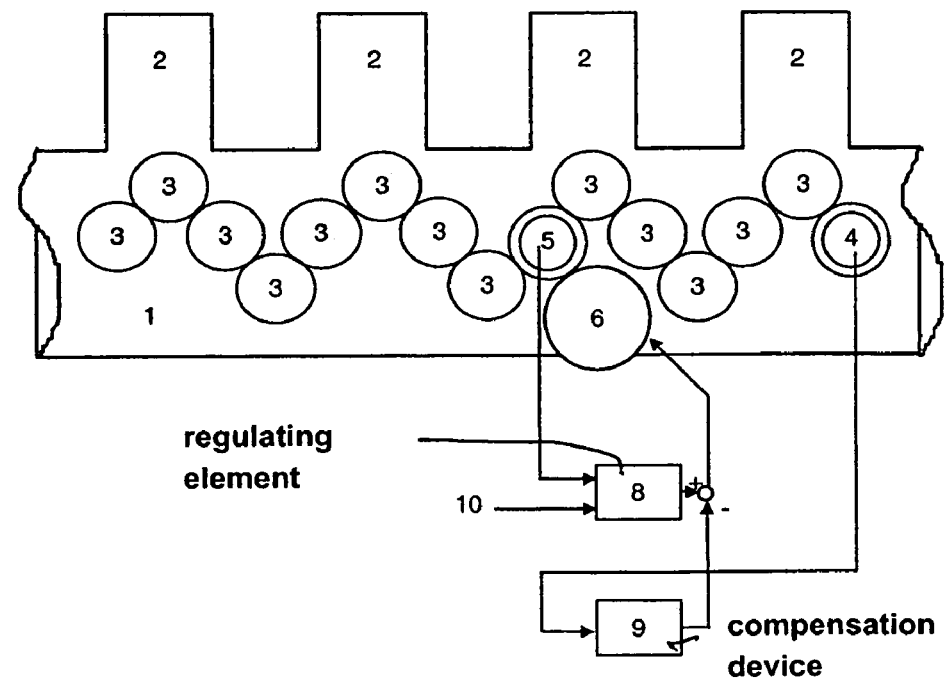
FIG. 10 shows another additional embodiment of a printing material processing machine having a regulating device and vibration compensation according to the invention.

FIG. 10 shows another embodiment of a printing material processing machine 1 having a regulating device and a vibration compensation device according to the present invention. This embodiment is advantageous for compensation of interference of orders not in the vicinity of the first natural frequency, in particular for lower frequencies than the first natural frequency. Printing material processing machine 1, having a plurality of printing units 2 and plurality of cylinders 3, has a compensation device 9 to whose input the rotational angle position signal of the rotation sensor of first cylinder 4 is applied. The output signal of compensation device 9 is subtracted from the output signal of regulating element 8, which received the angle position signal of a cylinder 5 to be compensated and an angle variable setpoint. The regulation is performed by a first actuator 6 which acts on cylinder 5.

It should be emphasized again that embodiments having different arrangements may be advantageous to different extents depending on the frequency to be compensated. A modal analysis of the total vibration observed permits conclusions to be drawn regarding advantageous arrangements. Measurement and/or compensation of vibration is difficult at those points where the vibration has a node or has a low amplitude.

LIST OF REFERENCE NUMBERS

1 Printing material processing machine
2 Printing unit
3 Cylinder
4 First cylinder
5 Second cylinder
6 First actuator for regulating the first cylinder
7 Second actuator for regulating the second cylinder
8 Regulating element
9 Compensation device
10 Angle variable setpoint
11 Web of printing material
12 Phase shift element
13 Filter with transfer function
14 Control device
15 Third cylinder

What is claimed is:

1. A compensation device for vibrations of an angle variable in a printing material processing machine having an associated actuator for affecting the angle variable, the compensation device receiving a representative signal representative of the angle variable, and the compensation device generating an output signal for the actuator, the compensation device comprising:

at least one filter having a transfer function or a sum of transfer functions having frequency parameters corresponding to vibration frequencies to be compensated, the output signal for at least one of the vibration frequencies to be compensated being a function of the representative signal passed through the at least one filter, wherein the transfer function is a Laplace transformation in the Z range wherein the transfer function is a function of $$\frac{1 - b_n z^{-1}}{1 - 2b_n z^{-1} + z^{-2}}$$

where
$b_n = \cos(\omega_n T)$, with $\omega_n$ representing the angle variable and T a sampling interval.

2. The compensation device as recited in claim 1 wherein the angle variable is an angle of rotation of a cylinder or an angle of rotation difference between a first cylinder and a second cylinder.

3. The compensation device as recited in claim 1 wherein the representative signal is a time series having a signal train defined at certain points in time.

4. The compensation device as recited in claim 1 wherein the compensation device includes a processor executing program steps for obtaining the output signal from the representative signal as a function of the transfer function or the sum of the transfer functions.

5. The compensation device as recited in claim 1 further comprising at least one linear phase shift element upstream or downstream from the filter or contained within the filter.

6. A printing unit in a printing material processing machine comprising:
   at least one cylinder, and
   a compensation device as recited in claim 1 associated with the cylinder.

7. A printing press comprising a printing unit as recited in claim 6.

8. A printing unit in a printing material processing machine comprising:
   at least one first cylinder;
   a second cylinder, and
   a compensation device as recited in claim 1 associated with the first cylinder and the second cylinder.

9. A printing unit group in a printing material processing machine comprising:
   a first printing unit having at least one first cylinder;
   a second printing unit having a second cylinder; and
   a compensation device as recited in claim 1 associated with the first cylinder and the second cylinder.

10. A printing press comprising a printing unit group as recited in claim 9.

11. A printing press comprising:
    at least one first cylinder;
    a second cylinder mechanically separated from the first cylinder, and
    a compensation device as recited in claim 1 associated with the first cylinder and the second cylinder.

12. A printing press comprising:
    at least one first cylinder, and
    a compensation device as recited in claim 1 associated with the first cylinder.

13. A regulating device for an angle variable in a printing material processing machine, the regulating device comprising:
    an angle variable transducer,
    a regulating element having a regulating output signal,
    an actuator affecting the angle variable, and
    a compensation device for vibrations of the angle variable as recited in claim 1, the output signal of the compensation device being superimposed on the regulating output signal.

14. The regulating device as recited in claim 13 wherein the representative signal represents a value of the angle variable or a value of a change in the angle variable or a value of an acceleration or deceleration in the angle variable.

15. The regulating device as recited in claim 13 wherein the regulating element has a first input for actual values of the representative signal of the angle variable and a second input for setpoints for the representative signal of the angle variable.

* * * * *